US007120819B1

(12) United States Patent
Gürer et al.

(10) Patent No.: US 7,120,819 B1
(45) Date of Patent: Oct. 10, 2006

(54) METHOD AND SYSTEM FOR FAULT DIAGNOSIS IN A DATA NETWORK

(75) Inventors: Denise Gürer, Scotts Valley, CA (US); Elaine Lusher, Pleasanton, CA (US)

(73) Assignee: 3Com Corporation, Marlborough, MA (US)

( * ) Notice: Subject to any disclaimer, the term of this patent is extended or adjusted under 35 U.S.C. 154(b) by 765 days.

(21) Appl. No.: 09/998,846

(22) Filed: Nov. 15, 2001

(51) Int. Cl.
*G06F 11/00* (2006.01)

(52) U.S. Cl. .............................. 714/4; 714/43; 714/48; 709/223; 709/224; 709/235

(58) Field of Classification Search .................. 714/4, 714/43, 48; 709/223, 224, 235
See application file for complete search history.

(56) References Cited

U.S. PATENT DOCUMENTS

| 5,404,503 A * | 4/1995 | Hill et al. .................. 714/31 |
| 5,790,780 A * | 8/1998 | Brichta et al. .............. 714/46 |
| 5,872,911 A * | 2/1999 | Berg ........................... 714/43 |
| 5,936,940 A * | 8/1999 | Marin et al. ................. 370/232 |
| 6,289,379 B1 * | 9/2001 | Urano et al. ................ 709/223 |
| 6,304,900 B1 * | 10/2001 | Cromer et al. .............. 709/221 |
| 6,654,914 B1 * | 11/2003 | Kaffine et al. ............... 714/43 |

* cited by examiner

*Primary Examiner*—Robert Beausoliel
*Assistant Examiner*—Emerson Puente

(57) ABSTRACT

Method and system of fault diagnosis in a data network. Specifically, one embodiment of the present invention discloses a method for automating the process of determining faults in a data network. A network management station (NMS) receives filtered fault data from the various subnetworks of computer systems that comprise the data network. Each of the subnetworks have an associated performance manager that monitors, collects and filters fault data from the subnetwork. Each of the performance managers send their respective filtered fault data to the NMS. The NMS further analyses the filtered fault data to identify the fault and locate a source of the fault within the topology of the data network. The NMS can further query the network for additional fault data as necessary. The NMS displays the fault, cause, and location of the cause to a network engineer for correction.

36 Claims, 7 Drawing Sheets

METHOD AND SYSTEM FOR FAULT DIAGNOSIS IN A DATA NETWORK

BACKGROUND OF THE INVENTION

1. Field of the Invention

The present invention relates to the field of network management. More specifically, the present invention relates to the self-diagnosis of faults within data networks.

2. Related Art

Today's high speed data networks are heterogeneous, more complex and increasingly data intensive. Thus, the networks are becoming more difficult to manage due to network complexity and size. Network engineers (NEs) manage the data networks and must be familiar with their specific data network's topology, the behavior of all the devices on their network, and be able to process huge amounts of seemingly unrelated data.

An important activity in network management is network diagnosis. A single fault in the data network can produce hundreds and even thousands of alarms that must be analyzed by the NE, which is a prohibitive task. Traditional network fault diagnosis required the direct involvement with a NE who analyzed large amounts of seemingly unrelated fault data to determine what is causing the data network to operate improperly.

The NE necessarily must have expertise in troubleshooting, an understanding of network device behavior, and specific knowledge regarding their network, such as, topology, typical traffic conditions, applications, and legacy systems. One problem with the management of data networks is that fewer NEs with the necessary specialized expertise are available. Thus, NEs are responsible for more area within the field of network management to overcome the lack of NEs in the field. However, allocation of the resources provided by the NE is inefficient. A NE spends an inordinate amount of time monitoring and troubleshooting a data network in order to resolve problems on the network. That time could be better spent accomplishing other network management tasks.

Prior Art FIG. 1 is an illustration of the traditional fault management as a process. A NE 150 has access to network data 130 and alarms 120 from a data network (e.g., local area network (LAN) 110). A network management tool can be used to monitor and collect performance data in the form of remote monitoring (RMON) data (e.g., RMON-1 and RMON-2), alarms, or events where present thresholds have been crossed. This data is aggregated and displayed to the NE in the form of display data 140, such as, graphs and tables.

Typically a troubleshooting episode is triggered by a user (not shown) of the data network 110. The user contacts the NE 150 with a problem regarding the network 110. For example, the user may be experiencing slowness in responses transmitted through the network 110, or the user may have lost connectivity.

At this point, it becomes the duty of the NE to isolate the fault and take corrective action. The NE can analyze the display data 140 to manually troubleshoot the problem. Many times, the display data 140 is insufficient, and so the NE must query the data network, as represented by the path 180 of queries, to further isolate and diagnose the fault. This usually takes the form of scripts, such as, ping, or traceroute, and through the use of sniffers. The network 110 then sends back to the NE query results in path 185.

Block 190 illustrates a flow chart of the process engaged by the NE 150 to perform troubleshooting. In step 160, the NE 150 analyses the fault data presented and diagnoses the fault. In step 165, the NE 150 develops and then implements a plan to correct the problem. Thereafter, the NE must verify the problem has been eliminated, in step 170. A NE may submit a report of the incident in step 175.

Thus, network diagnosis in the prior art was a manual process conducted by the NE. As FIG. 1 illustrates, the NE is responsible for isolating and identifying faults that are causing the problem. This can be time consuming and tedious, especially for large enterprise networks. As such, the analysis of fault data by the NE in today's larger heterogeneous networks is prone to error due to the large amounts of fault data to be manually processed.

Thus, a need exists for lessening the burden on a network engineer in the process of diagnosing faults within a data network. A further need exists for increasing efficiency in the process of diagnosing faults within a data network.

SUMMARY OF THE INVENTION

The present invention provides a method for self-diagnosing faults within a data network. One embodiment of the present invention provides a method that achieves the above accomplishment and which also provides for a method and system that lessens the burden on a network engineer when diagnosing faults. Additionally, one embodiment of the present invention provides a method and system that achieves the above accomplishments and which also provides for increased efficiency in the process of diagnosing faults within a data network.

Specifically, one embodiment of the present invention discloses a method for automating the process of determining faults in a data network. A network management station (NMS) receives filtered fault data from the various subnetworks of computer systems that comprise the network. Each of the subnetworks have an associated performance manager that monitors, collects and filters fault and network performance data from the subnetwork. Each of the performance managers send their respective filtered data to the NMS. The NMS further analyses the filtered data to identify the fault and locate a source of the fault within the topology of the network. The NMS can further query the network for additional fault and network performance data as necessary. The NMS displays the fault, cause of the fault, and location of the fault to a network engineer for correction.

These and other benefits of the present invention will no doubt become obvious to those of ordinary skill in the art after having read the following detailed description of the preferred embodiments which are illustrated in the various drawing figures.

BRIEF DESCRIPTION OF THE DRAWINGS

PRIOR ART

DETAILED DESCRIPTION OF THE INVENTION

Figure 1:
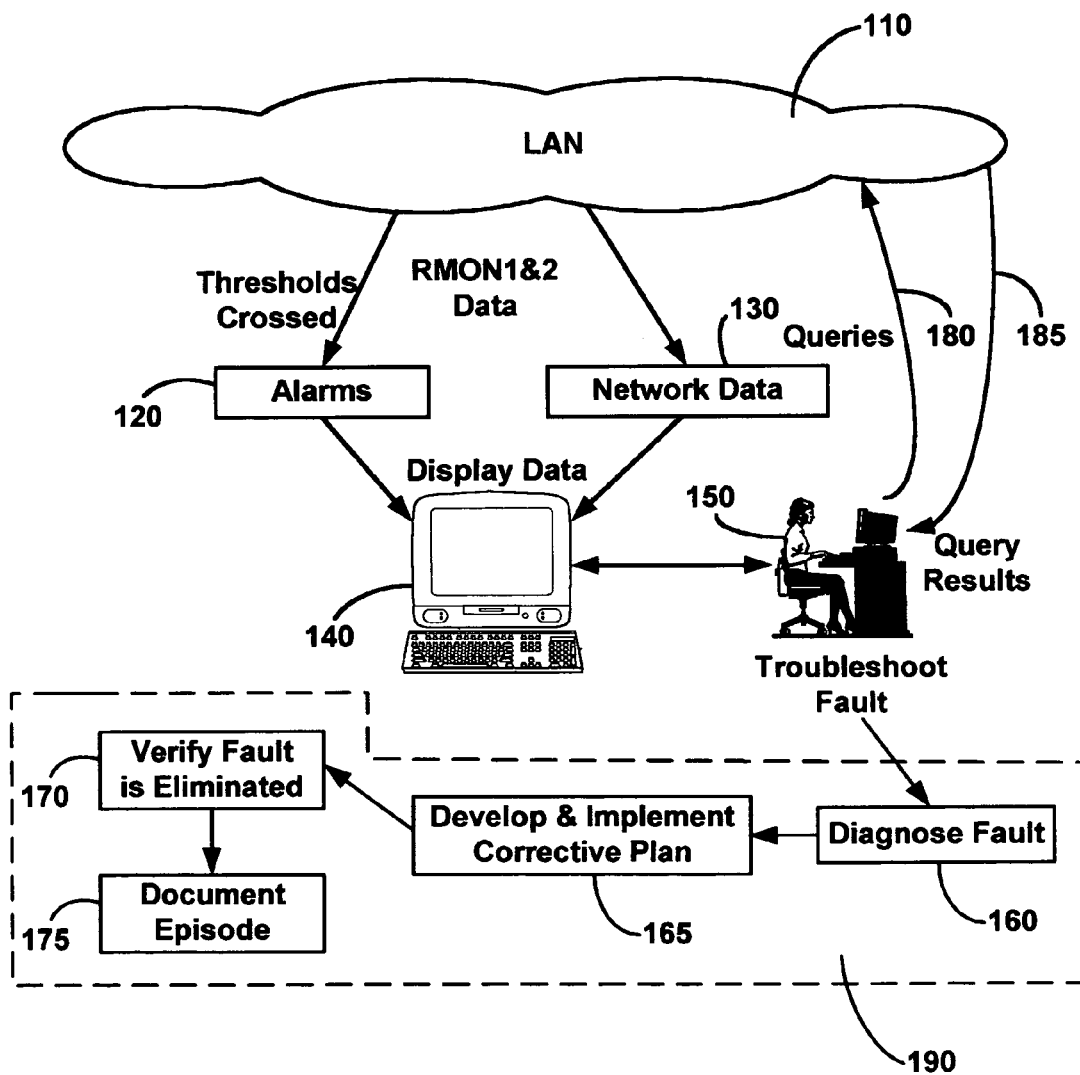
FIG. 1 is a block diagram illustrating the traditional primary role of the network engineer within a process for diagnosing a fault within a data network.

Reference will now be made in detail to the preferred embodiments of the present invention, a method for diagnosing faults within a data network, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," or "processing," or "filtering," or "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
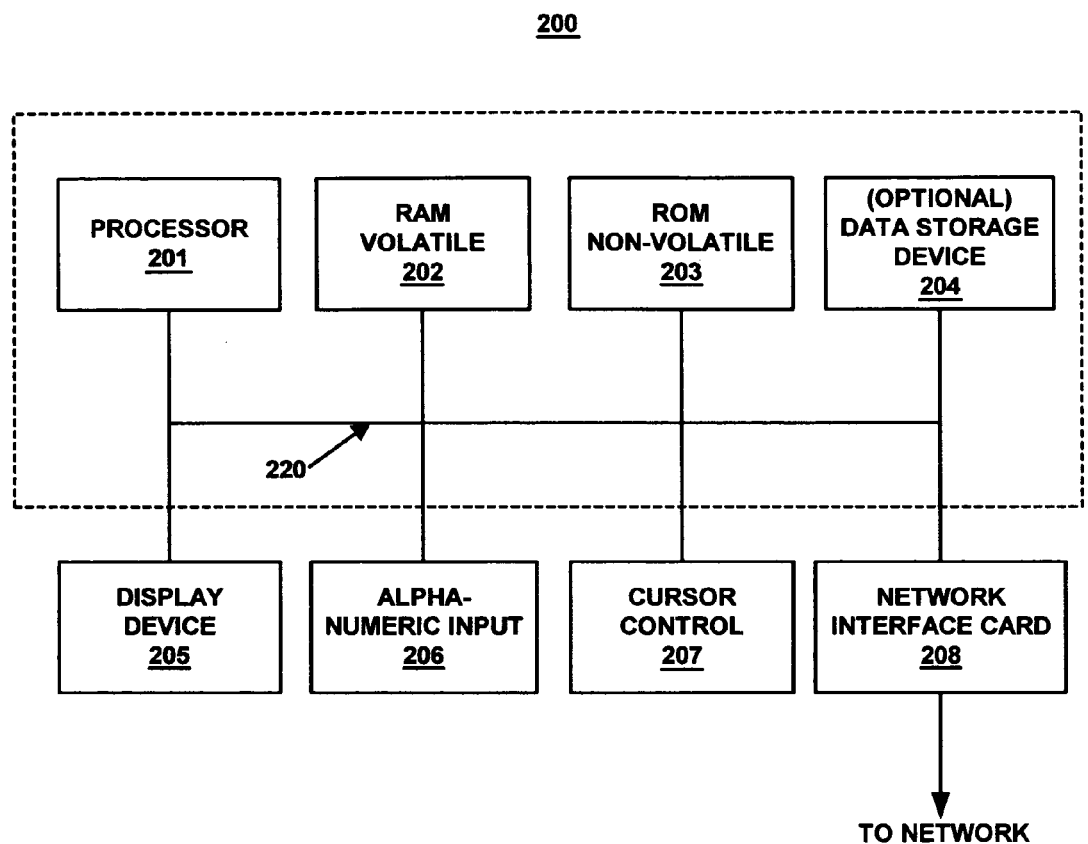
FIG. 2 illustrates a block diagram of an exemplary electronic device that is capable of diagnosing a fault in a data network, in accordance with one embodiment of the present invention.

Referring now to FIG. 2, portions of the present invention are comprised of computer-readable and computer-executable instructions which reside, for example, in computer-readable media of a computer system. FIG. 2 is a block diagram of exemplary interior components of an exemplary computer system 200, upon which embodiments of the present invention may be implemented.

FIG. 2 illustrates circuitry of an exemplary computer system 200. Exemplary computer system 200 includes an address/data bus 220 for communicating information, a central processor 201 coupled with the bus 220 for processing information and instructions, a volatile memory 202 (e.g., random access memory (RAM), static RAM dynamic RAM, etc.) coupled with the bus 220 for storing information and instructions for the central processor 201, and a non-volatile memory 203 (e.g., read only memory (ROM), programmable ROM, flash memory, EPROM, EEPROM, etc.) coupled to the bus 220 for storing static information and instructions for the processor 201.

Exemplary computer system 200 also includes an optional data storage device 204 (e.g., memory card, hard drive, etc.) coupled with the bus 220 for storing information and instructions. Data storage device 204 can be removable. Exemplary computer system 200 also contains an electronic display device 205 coupled to the bus 220 for displaying information to a user. The display device 205 utilized with the computer system 200 may be a liquid crystal device, cathode ray tube (CRT), field emission device (FED, also called flat panel CRT) or other display device suitable for creating photographic or graphical images.

Exemplary computer system 200 also contains an alpha-numeric input 206 for communicating information and command selections to the central processor 201. In addition, system 200 also includes an optional cursor control or directing device 207 coupled to the bus 220 for communicating user input information and command selections to the central processor 201.

With reference still to FIG. 2, an optional signal Input/Output device 208, which is coupled to bus 220 for providing a communication link between computer system 200 and a network environment, is described. As such signal Input/Output device 208 enables the central processor unit 201 to communicate with or monitor other electronic systems or analog circuit blocks coupled to a data network.

Diagnosing Faults in a Datanetwork

Accordingly, the present invention provides a method for diagnosing faults within a data network. Also, one embodiment of the present invention provides a method that lessens the burden on a network engineer for diagnosing faults within a data network. Still another embodiment of the present invention increases the efficiency of diagnosing faults within a data network.

Figure 3:
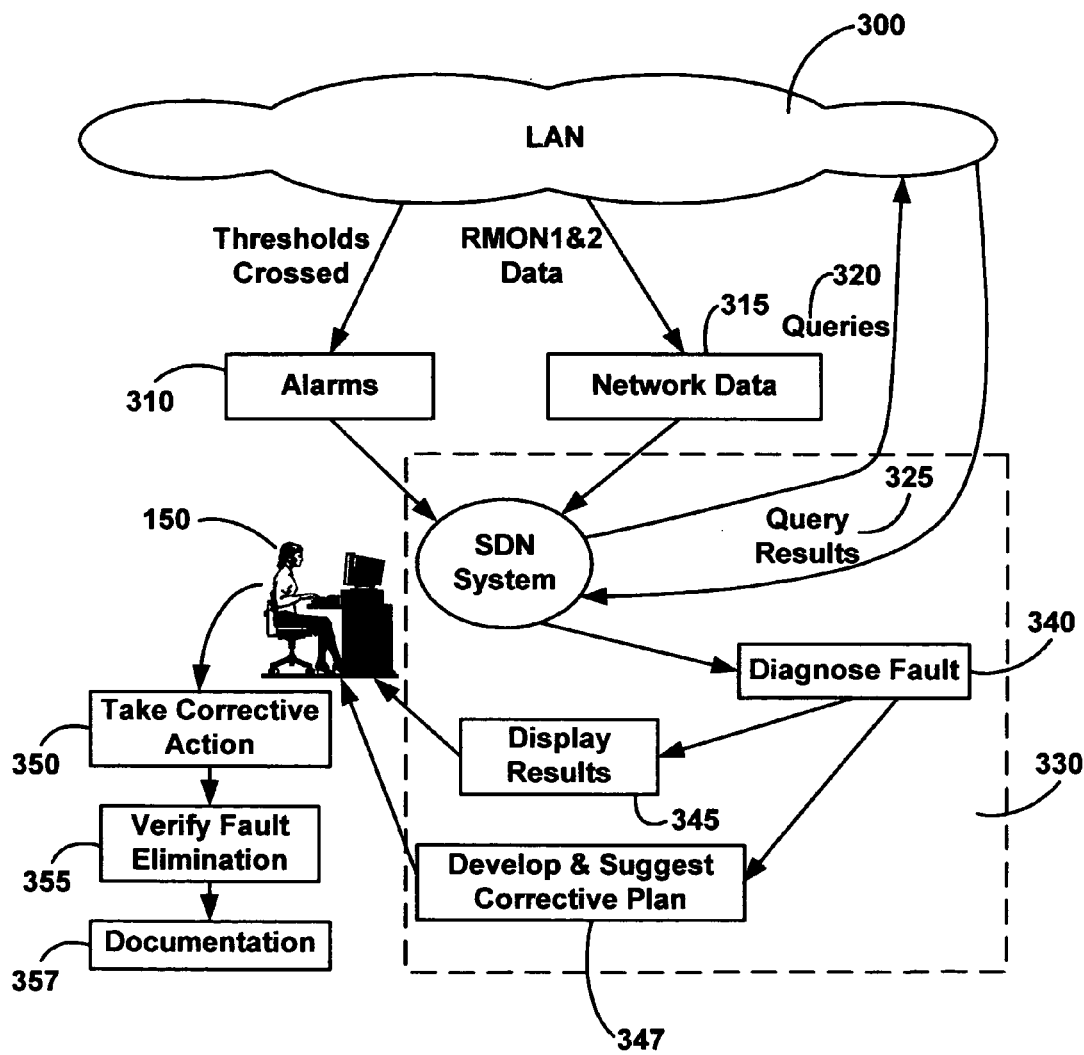
FIG. 3 is a block diagram illustrating a process for self diagnosing a fault within a data network, in accordance with one embodiment of the present invention.
Figure 4:
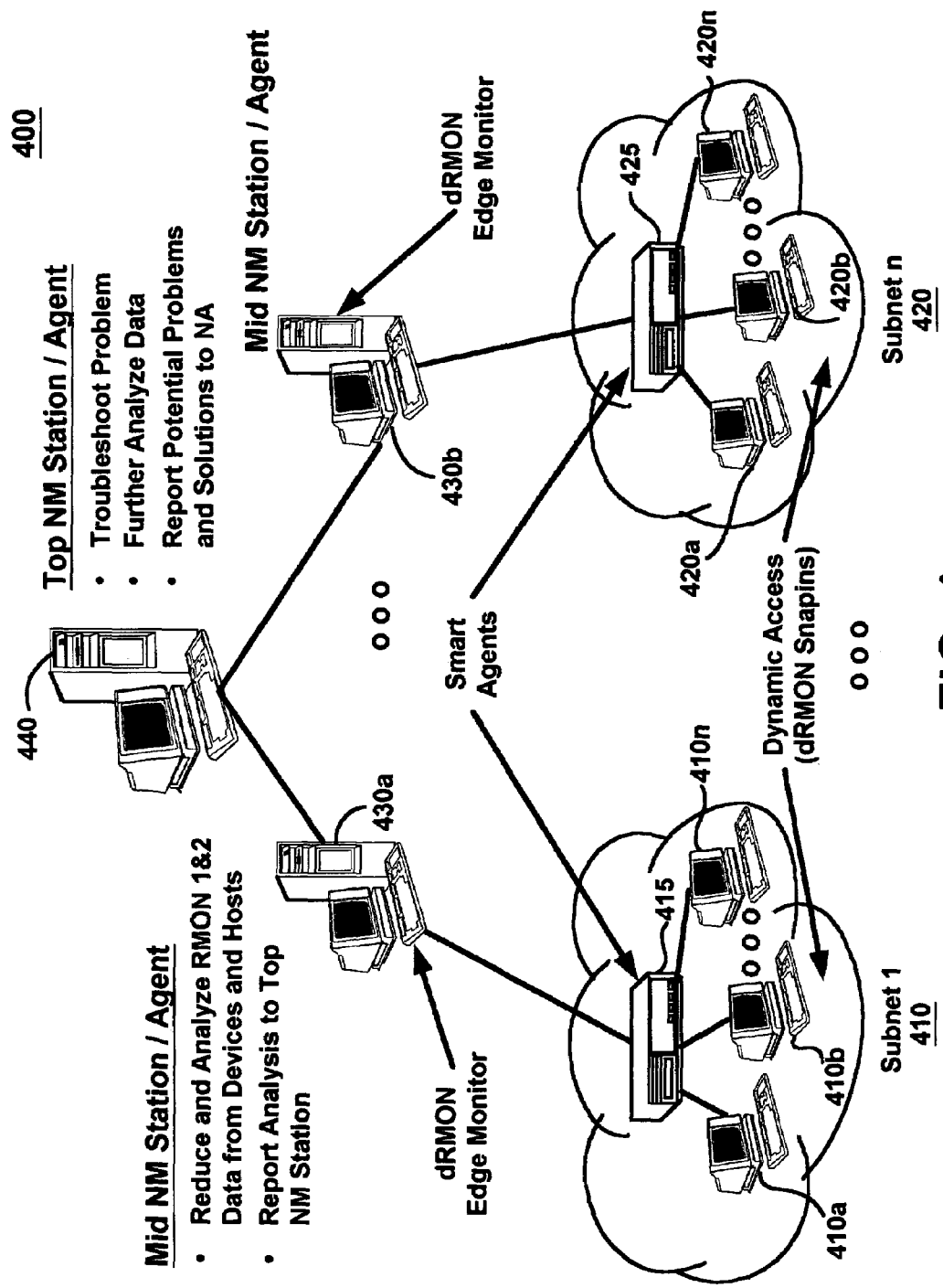
FIG. 4 is a diagram illustrating an exemplary data network that is capable of diagnosing faults, in accordance with one embodiment of the present invention.
Figure 5:
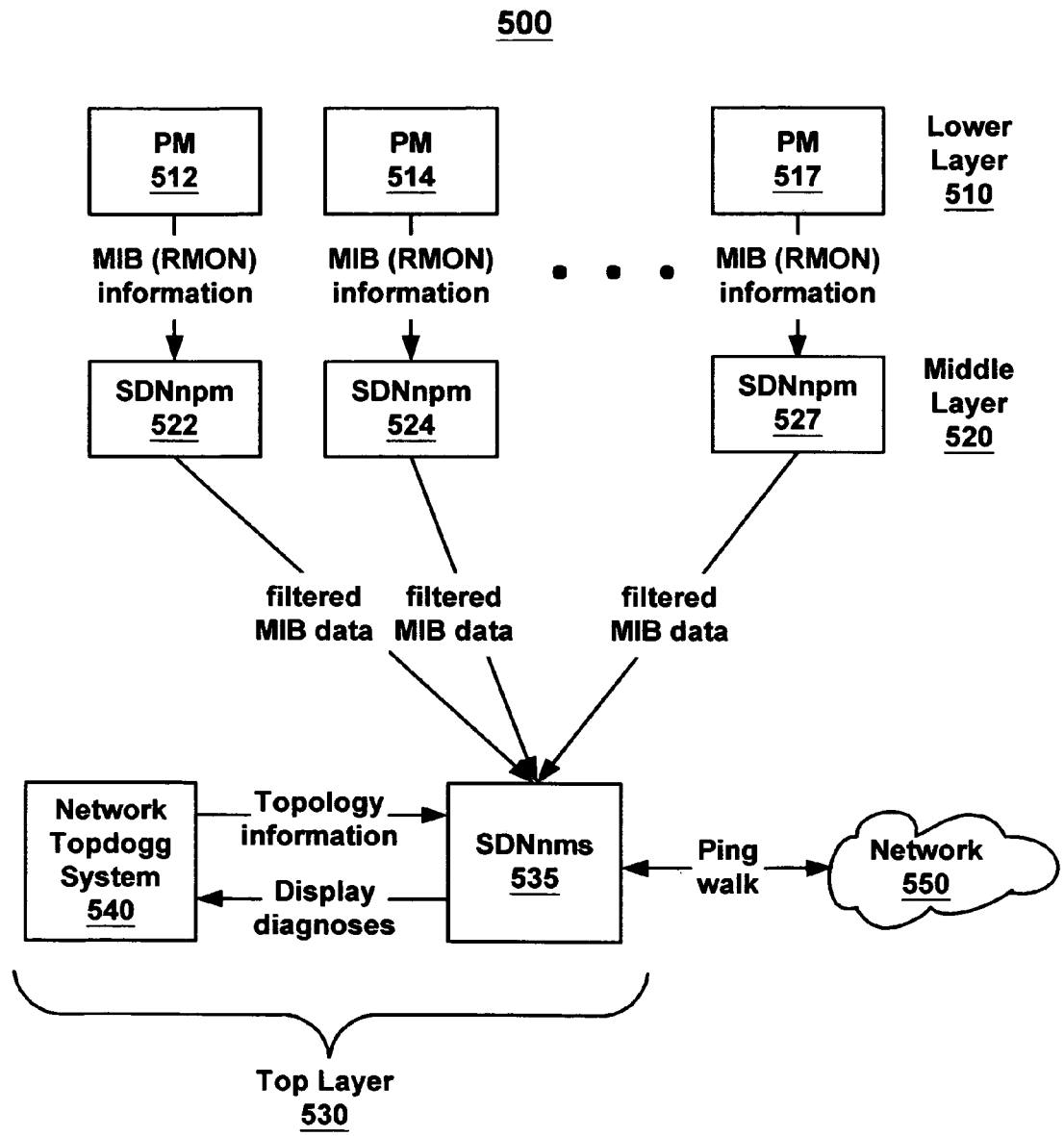
FIG. 5 is a block diagram of an exemplary data network that is capable of diagnosing faults, in accordance with one embodiment of the present invention.
Figure 6:
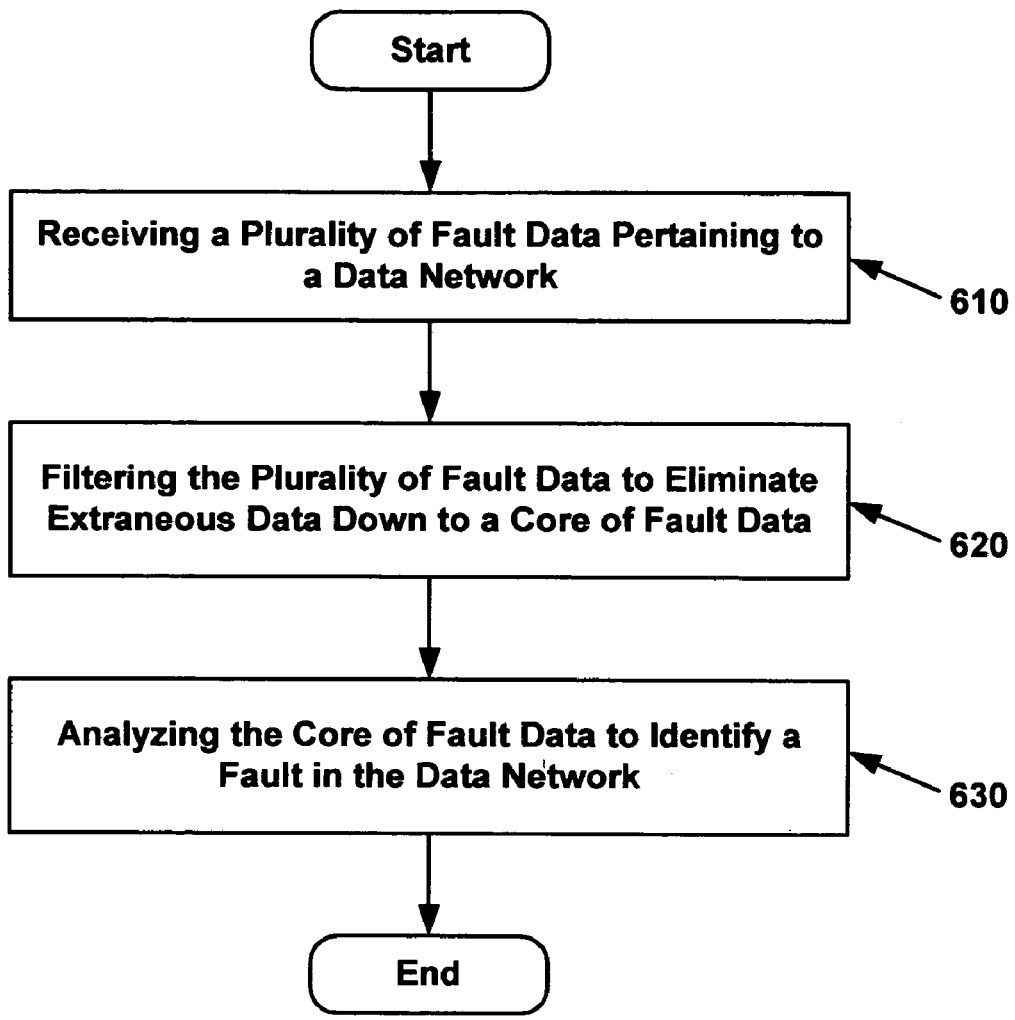
FIG. 6 is a flow diagram illustrating steps in a method for diagnosing faults within a data network, in accordance with one embodiment of the present invention.
Figure 7:
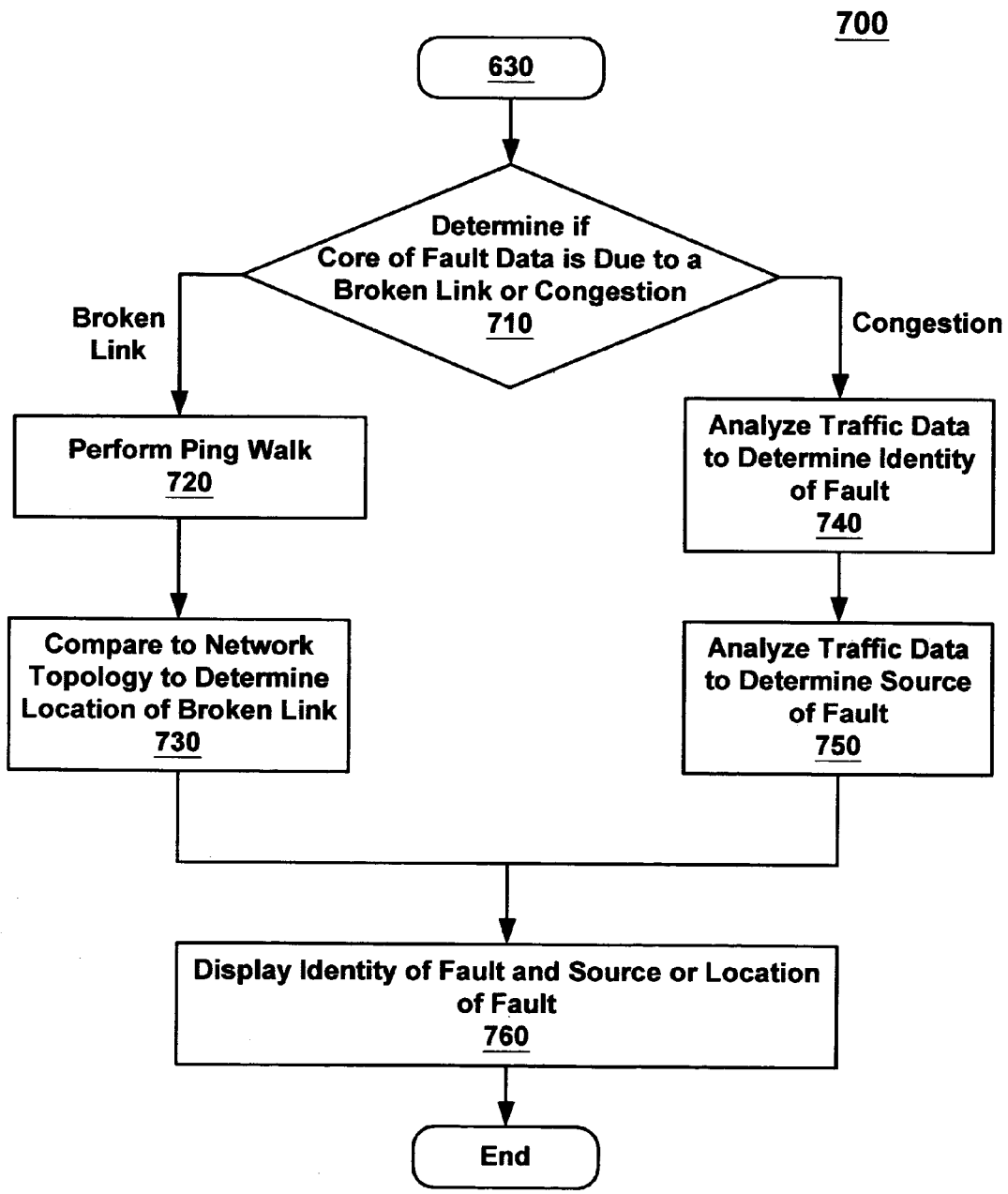
FIG. 7 is a flow diagram illustrating steps in a method for analyzing fault data in order to identify two exemplary fault types and isolate the source of instances of the faults.

The flow charts 600 and 700 of FIGS. 6 and 7, in combination with FIGS. 3, 4, and 5, illustrate a method for self diagnosing network faults within a data network, in the present invention. The FIGS. 3, 4, and 5 provide a system architecture for implementing the method outlined in flow chart 600 of self diagnosing a data network.

Although embodiments of the present invention are discussed within the context of a data network, other embodiments are well suited for implementation within communication networks that are internet-protocol (IP) based data networks, such as a Transmission Control Protocol/Internet Protocol (TCP/IP) based data network.

Network faults can be classified as hardware and software faults. These hardware and software faults can in turn cause other fault effects in the network such as congestion or even network failure.

Examples of hardware faults are failures of devices due to physical external events, such as, accidents (e.g., kicking a cable loose), mishandling, or improper installation, etc. Other hardware faults are due to the aging of the device and/or weaknesses in the design of the hardware device.

Software faults cause network devices to produce incorrect outputs. Software faults occur as slow or faulty service by the network due to incorrect information (e.g., erroneous router tables) or erratic behavior of the device due to software bugs, (e.g., incorrect processing of packets). Software faults can also surface as lack of communication service if software tables have become corrupted (e.g., spanning tree loops that result in no packet forwarding at all).

With reference now to FIG. 3 and flow chart 600 of FIG. 6, exemplary steps used by the various embodiments of the present invention are illustrated. Flow chart 600 includes processes of the present invention which, in one embodiment, are carried out by a processor under the control of computer-readable and computer executable instructions. The computer-readable and computer-executable instructions reside, for example, in data storage features such as computer usable volatile memory 202, computer usable non-volatile memory 203, and/or data storage device 204 of FIG. 2. The computer readable and computer-executable instructions are used to control or operate in conjunction with, for example, central processing unit 201 of FIG. 2.

In FIG. 3, an exemplary communication network 300 is shown that is capable of self diagnosing faults as illustrated by the flow chart 600, in accordance with one embodiment of the present invention. As shown in FIG. 3, system 300 is a local area network (LAN), but other embodiments are well suited to other networks having a plurality of remotely located and coupled computer systems. In one embodiment, the communication network 300 is a transmission control protocol/internet protocol (TCP/IP) based data network.

A generalized self diagnosing network (SDN) system 335 controls the process 330 of automating the diagnosis of faults within the data network 300. In the present embodiment, the SDN system 335 receives a plurality of fault data, as illustrated in step 610 of flow chart 600. For example, the SDN system 335 receives alarm data 310 from the data network 300. Alarm data 310 come in the form of alarms or events where preset thresholds within devices of the data network 300 have been exceeded or not been met. In addition, network data 315 consists of performance data that is constantly monitored by a network management tool. In one present embodiment, the network data 315 consists of the standardized remote monitoring 1&2 (RMON 1&2) data.

The SDN system 335 can also make further queries to the data network 300 for the fault diagnosis process if there is insufficient data. The SDN system 335 sends queries 320 for fault data to devices on network 300. The responses or query results 325 are sent directly back to the SDN system 335 to be combined with the previously collected and received fault data.

Block 330 of FIG. 3 illustrates a generalized process for diagnosing faults within a data network 300 by the SDN system 335. The steps illustrated in flow chart 600 are embedded in the diagnosing fault block 340 of FIG. 3.

In step 620 of flow chart 600, the present embodiment filters the fault data to eliminate extraneous data. The filtering process significantly reduces the amount of fault data. In the present embodiment, alarm filtering can be accomplished by eliminating multiple occurrences of the same alarm, inhibiting low priority alarms, generalizing alarms to their superclasses (as determined by domain experts), and replacing a specified occurrence of similar alarms with a single "count" alarm. Other embodiments are well suited to the use of other filtering processes.

In one embodiment, the filtering process can be implemented through rules or algorithms. The data appears in the form of alarms, RMON 1&2 data, or any other suitable monitored data.

Once alarms are filtered, there is still an enormous amount of data to be analyzed. Coupled with the filtering process of step 620, the present embodiment also correlates the alarms by substituting a new item for a set of alarms that match a predefined pattern. In one embodiment, this process can be approached as a pattern recognition problem.

In one embodiment, alarm correlation requires the speedy analysis of large amounts of fault data. The fault data is quickly classified into recognized patterns, clusters, or categories of fault data. For this task, statistical and probabilistic approaches are appropriate, such as, using neural network analysis, or statistical algorithms. The output takes on the form of problem types and characteristics that are recognizable in troubleshooting the data network 300.

After filtering and correlating the plurality of fault data from the network 300, a core of fault data is produced by the SDN system 335. This core of fault data is further analyzed by the SDN system 335 by the present embodiment, in step 630 of flow chart 600. The analytical process of step 630 detects the fault by identifying the type of fault and isolating the misbehaving device in the network that is the cause of the fault.

In one embodiment of the present invention, the analytical process of fault detection in step 630 requires a symbolic approach. In this symbolic approach, the fault data that is filtered and correlated, and other suitable network data, can be analyzed to determine if more data must be obtained (e.g., obtained through the use of scripts, such as, ping or traceroute).

In another embodiment, the fault diagnosis process as outlined in flow chart 600 is an iterative process. In other words, when additional and different data is needed from the data network 300 to assist in diagnosing the fault, the present embodiment sends requests for more fault or network performance data, receives the answers to those request, and continues to troubleshoot the problem using the newly acquired information.

Referring now to FIG. 7, flow chart 700 illustrates steps in the analytical process that is outlined in step 630 of FIG. 6, in accordance with one embodiment of the present invention. From step 630, the present embodiment implements the analytical process by determining if the core of fault data is due to two example faults: a broken link or congestion within the data network 300, in condition block 710.

If the core of fault data is due to a broken link within the network 300, then the present embodiment via SDN system 335 performs a ping walk in step 720. Those well versed in the art understand that the function of the ping walk is to traverse the network topology (or map) generated by a networking monitoring tool by pinging all the Internet Protocol (IP) addressed devices in the network 300 and identifying those that are not reachable from anywhere.

In step 730, after the ping walk is performed, the results of the ping walk are compared to the network topology to determine the location of a broken link. In one embodiment, the network topology is produced by a network monitoring tool that produces a tree representation of the data network 300 which uses arcs and nodes to represent the network topology. Those well versed in the art understand that the arcs represent pings and the nodes represent devices on the network.

If however, the SDN system 335 determines that the core of fault data is due to congestion, then flow chart 700 proceeds to step 740. Typically, congestion occurs when a device or a link in the network is experiencing delay or packet loss due to congestion conditions such as, the load on the network or a bottleneck. Congestion is detected by examining traffic data that is monitored. Congestion collapse of a network occurs when the total productive work done by a network decreases significantly with an increase in the load on the network.

The traffic data is comprised of delay, packet loss, and queue size, in one embodiment. A delay in a network is an increase in time a packet has to wait at a network device before being forwarded. Packet loss is the percentage of packets which are dropped due to queue overflows. Queue size is the length of the packets queued at a network device. Queue size gives the earliest indication of congestion, followed by delay, and then by packet loss. If congestion is detected early, often only small adjustments are needed to cure the congestion.

For example, delay is commonly measured by looking at the round trip time of packets in the network. Those well versed in the art understand that pinging is a useful tool in probing links for congestion, in one embodiment. On end nodes of a network which are communicating via TCP, the round trip time maintained as a baseline target is an excellent direct measure of network delay. By pinging various internet protocol (IP) devices addressed in the network, possible problems due to delay may be alerted to the NE and averted.

In step 740, the present embodiment analyses traffic data to determine the identity of the fault, due to congestion, that is associated with the core of fault data. Traffic data is RMON 1&2 data, or any other monitored network data, such as, delay. In step 750, the present embodiment analyses the traffic data to isolate the source of the core of fault data.

In step 740 and 750 of flow chart 700, in one embodiment the process of deductive reasoning is used to determine the type of fault, the cause of the fault, and the location of the fault. In one embodiment, the deductive process used to identify and isolate the fault is implemented using fuzzy pattern matching technologies such as case-based reasoning or deductive/inductive logic techniques such as expert systems.

Referring now back to FIG. 3, in block 345 of the generalized process for fault diagnosis of block 330, the SDN system 335 displays the results (e.g., identifying the type of fault, the cause, and the source of the fault) to the network engineer with an explanation of its reasoning, in accordance with one embodiment of the present invention. In another embodiment, a short description of possible remedial or corrective actions is developed and displayed to the NE as shown by block 347.

The SDN system 335 as illustrated in block 330 of FIG. 3 illustrates the easing of the burden on the NE 150 by automating the fault diagnosis process. This is done by automating the analysis burden. However, in another embodiment, the NE continues to retain as much control over the automation process as is needed.

As shown in FIG. 3, the NE receives information at a much later point than in the traditional fault diagnosis process as illustrated in Prior Art FIG. 1. The burden of analyzing the large amounts of fault data is now provided by the SDN system 335. The NE can step in later in the fault diagnosis process and utilize the information provided by the SDN system 335 regarding fault identification and source isolation to take an appropriate corrective action, in block 350. After implementing a remedy, the NE can further verify fault elimination in block 355. And in block 357, the NE can provide documentation of the fault and the remedies implemented.

FIGS. 4 and 5 are diagrams illustrating exemplary architectures of self diagnosing networks (SDN) systems. FIG. 4 gives an exemplary architecture of a SDN system 400. FIG. 5 gives a block diagram of an exemplary SDN system 500 that is representative of the architecture of SDN system 400.

Referring now to FIG. 4, the SDN system 400 is comprised of a multi-layered network. The lower layer is comprised of a plurality of subnetworks (subnets), e.g., subnet-1 410 on up to subnet-n 420. The plurality of scaleable subnetworks create the data network (e.g., the network LAN 300 of FIG. 3).

Located within each of the subnetworks (e.g., subnet-1 410 on up to subnet-n 420), are edge devices and core devices. The edge devices are comprised of electronic systems, such as, computer systems, printers, facsimile machines, etc. In subnet-1 410, the edge devices are 410*a*, 410*b*, on up to 410*n*. In subnet-n 420, the edge devices are 420*a*, 420*b*, on up to 420*n*. Each of the edge devices are capable of collecting RMON 1&2 data for network performance and fault monitoring that is used for fault analysis, in one embodiment.

The core devices within the subnetworks (410 on up to 420) are comprised of network support devices, such as, routers, switches, hubs, etc. Most of the core devices are also capable of collecting RMON 1&2 data for fault monitoring and fault analysis, in one embodiment. In subnet-1 410, the core device 415 is coupled to each of the edge devices, 410*a*, 410*b*, on up to 410*n*. In subnet-2 420, the core device 425 is coupled to each of the edge devices, 420*a*, 420*b*, on up to 420*n*.

The RMON 1&2 data collected in each of edge devices of subnet-1 410 and subnet-2 420 are passed on up to their respective core device and then sent to a middle layer edge monitor. For example, in subnet-1 410, the RMON 1&2 data is sent to the edge monitor 430*a*. In subnet-2-420, the RMON 1&2 data is sent to the edge monitor 430*b*.

Each of the edge monitors at the middle layer provide the filtering and correlating of the RMON 1&2 fault data produced by each of the edge and core devices located in their respective subnets, as illustrated in step 620 of the fault diagnosis process of flow chart 600.

After the fault data is reduced to a core of fault data by filtration and correlation, the core of fault data is transferred to the top layer. The top layer is comprised of a network management station 440 that is coupled to each of the subnetworks (e.g., subnetwork-1 410 on up to subnetwork-n 420) via their respective edge monitors (e.g., 430*a* and 430*b*). The network management station 440 provides the analysis portion of the SDN system 400, as illustrated in step 630 of flow chart 600. In general, the station 440 troubleshoots any problems experienced by the network 400, further analyzes the core of fault data, and reports potential problems and solutions to the network engineer managing the network 400.

With reference to FIG. 5, the SDN system 500 is similar to the architecture of FIG. 4, in accordance with one embodiment of the present invention. The SDN system 500 is comprised of three layers, a lower layer 510, a middle layer 520, and a top layer 530. The SDN system 500 is capable of diagnosing faults within the communication system or network 550.

In comparison to FIG. 4, the lower layer 510 of FIG. 5 is analogous to the core and edge devices that comprise each of the subnetworks (e.g., subnet-1 410 and subnet-n 420). In FIG. 5, the lower layer is comprised of performance managers (e.g., 512, 514, on up to 517). Each of these performance managers devices supply management information base (MIB) information to the SDN system 500, such as RMON 1&2 data, in one embodiment. Other embodiments are well suited to other MIB tables to be incorporated in to the diagnostic system.

The middle layer 520 of FIG. 5 consists of SDN network performance managers (SDNnpm), such as, SDNnpm 522, SDNnpm 524, and SDNnpm 527. In comparison to FIG. 4, the middle layer 520 of FIG. 5 is analogous to each of the edge monitors (430a and 430b) that are associated with respective subnetworks. The role of the SDNnpm (e.g., 522, 524, and 527) within the SDN system 500, is to poll the various coupled performance managers devices (e.g., 512, 514, and 517 respectively) for MIB data, filter and correlate those data (e.g., step 620 of flow chart 600), and transfer the remaining data that has been filtered and correlated to the top layer 530.

The top layer 530 of FIG. 5 consists of a SDN network management system (SDNnms) 535. In comparison to FIG. 4, the SDNnms 535 is analogous to the top network management station 440. The SDNnms 535 acts as the central control of the SDN system 500 and performs the fault diagnosis of the data network 550, as illustrated in step 630 of flow chart 600.

In addition, the SDNnms 535 interacts with a network topology system 540 for topology information regarding the network 550. The topology system 540 discovers the topology of the network 550 and supplies this topology to the SDNnms 535 in graphical form. Thereafter, the SDNnms 535 is able to perform fault diagnosis of the network 550 utilizing the network topology to isolate the source of faults due to broken links and congestion.

While the methods of embodiments illustrated in flow charts 600 and 700 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for diagnosing faults within a communication network, is thus described. While the present invention has been described in particular embodiments, it should be appreciated that the present invention should not be construed as limited by such embodiments, but rather construed according to the below claims.

What is claimed is:

1. A method for fault diagnosis of a data network comprising:
   a) receiving a plurality of fault data pertaining to said data network;
   b) filtering said plurality of fault data to obtain a core of fault data;
   i) querying said data network to generate additional fault data different from said plurality of fault data when said core of fault data is insufficient to identify faults;
   ii) receiving said additional fault data; and
   c) analyzing said core of fault data and said additional fault data to identify a fault associated with said core of fault data.

2. The method for fault diagnosis as described in claim 1, wherein b) comprises:
   implementing a set of rules for filtering said plurality of fault data.

3. The method for fault diagnosis as described in claim 1, wherein b) comprises:
   eliminating redundant fault data in said plurality of fault data to obtain said core of fault data.

4. The method for fault diagnosis as described in claim 1, wherein said b) comprises:
   b1) correlating said plurality of fault data into recognized patterns of data comprising said core of fault data.

5. The method for fault diagnosis as described in claim 1 wherein said plurality of fault data is taken from a group consisting of:
   alarms;
   events;
   remote monitoring (RMON)-1 data; and
   RMON-2 data.

6. The method for fault diagnosis as described in claim 1, wherein c) further comprises:
   determining whether said fault is due to a broken link or congestion in said data network.

7. The method for fault diagnosis as described in claim 6, further comprising:
   implementing a ping walk through said data network to determine a location of said broken link, if said fault is due to said broken link.

8. The method for fault diagnosis as described in claim 6, further comprising:
   isolating a source of said fault, if said fault is due to said congestion in said data network.

9. The method of fault diagnosis as described in claim 1, further comprising:
   displaying network location of said fault; and
   displaying a cause of said fault.

10. The method of fault diagnosis as described in claim 1, wherein said fault data includes performance data from said data network.

11. A method of fault diagnosis comprising:
   a) receiving a plurality of fault data pertaining to said data network;
   b) filtering said plurality of fault data to eliminate extraneous data down to a core of fault data;
   i) querying said data network to generate additional fault data different from said plurality of fault data when said core of fault data is insufficient to identify faults;
   ii) receiving said additional fault data;
   c) determining whether said core of fault data and said additional fault data is due to a broken link or congestion in said data network;
   d) performing a ping walk to isolate a source of said core of fault data and additional fault data and to determine a location of said source, if said core of fault data and additional fault data is due to said broken link; and
   e) using deductive reasoning to isolate said source of said core of fault data and additional fault data and identify said cause of said core of fault data and additional fault data, if said core of fault data and additional fault data is due to said congestion.

12. The method for fault diagnosis as described in claim 11, wherein b) comprises:
   eliminating redundant fault data in said plurality of fault data to obtain said core of fault data.

13. The method for fault diagnosis as described in claim 11, wherein b) comprises:
- b1) correlating said plurality of fault data into a recognized pattern of data forming said core of fault data.

14. The method for fault diagnosis as described in claim 11, wherein d) comprises:
- sending a ping signal to each of a plurality of addresses in said data network;
- determining which addresses are unreachable; and
- comparing a network topology to unreachable addresses to determine a location of said broken link in said data network.

15. The method for fault diagnosis as described in claim 11, wherein e) comprises:
- e1) monitoring said data network to determine traffic data; and
- e2) analyzing said traffic data using said deductive reasoning to isolate said source and identify said fault.

16. The method for fault diagnosis as described in claim 15, wherein e1) comprises:
- determining queue length in network devices;
- determining delay over a path in said data network; and
- determining load of traffic over said data network.

17. The method of fault diagnosis as described in claim 11, further comprising:
- querying said data network for additional fault data if said core of fault data is insufficient to identify said fault.

18. The method of fault diagnosis as described in claim 11, further comprising:
- correcting said fault.

19. A data network that is capable of fault diagnosis comprising:
- a plurality of subnetworks that generate a plurality of fault data, each of said plurality of subnetworks comprising network components that are coupled together via a distributing component;
- a plurality of performance managers coupled to said plurality of subnetworks for monitoring said plurality of subnetworks for said plurality of fault data, for filtering said plurality of fault data, and for querying said plurality of subnets to generate additional fault data different from said plurality of fault data when said plurality of fault data is insufficient to identify faults, each of said plurality of network performance managers coupled to and associated with one of said plurality of subnetworks; and
- a single network management station coupled to each of said plurality of performance managers for analyzing said plurality of fault data that is filtered and said additional fault data to identify faults and isolate sources of said faults.

20. The data network as described in claim 19, wherein said network components are computer systems.

21. The data network as described in claim 19, wherein said distributing component is a switch.

22. The data network as described in claim 19, wherein said plurality of fault data is management information base (MIB) information that is generated by said network components and said distributing component in each of said plurality of subnetworks.

23. The data network as described in claim 19, further comprising:
- a rule set that is implemented by said network management station for analyzing said plurality of fault data and said additional fault data that are filtered to identify said faults and isolate said sources of said faults.

24. The data network as described in claim 19, further comprising:
- a rule set that is implemented by each of said plurality of performance managers for filtering said plurality of fault data and said additional fault data.

25. The data network as described in claim 19, wherein said plurality of fault data includes performance data from said data network.

26. The data network as described in claim 19, wherein each of said plurality of performance managers is a self diagnosing network performance manager (SDNNPM).

27. A computer system comprising:
- a processor;
- a display coupled to said processor;
- a computer readable memory coupled to said processor and containing program instructions that, when executed, implement the steps of:
  - a) receiving a plurality of fault data pertaining to said data network;
  - b) filtering said plurality of fault data to obtain a core of fault data;
  - i) querying said data network to generate additional fault data different from said plurality of fault data when said core of fault data is insufficient to identify faults;
  - ii) receiving said additional fault data; and
  - c) analyzing said core of fault data and said additional fault data to identify a fault associated with said core of fault data.

28. The computer system as described in claim 27, wherein b) in said method comprises:
- implementing a set of rules for filtering said plurality of fault data.

29. The computer system as described in claim 27, wherein b) in said method comprises:
- eliminating redundant fault data in said plurality of fault data to obtain said core of fault data.

30. The computer system as described in claim 27, wherein b) in said method comprises:
- b1) correlating said plurality of fault data into recognized patterns of data comprising said core of fault data.

31. The computer system as described in claim 27, wherein said plurality of fault data is taken from a group consisting of:
- alarms;
- events;
- remote monitoring (RMON)-1 data; and
- RMON-2 data.

32. The computer system as described in claim 27, wherein c) in said method further comprises:
- determining whether said fault is due to a broken link or congestion in said data network.

33. The computer system as described in claim 32, wherein said method further comprises:
- implementing a ping walk through said data network to determine a location of said broken link, if said fault is due to said broken link.

34. The computer system as described in claim 32, wherein said method further comprises:
- isolating a source of said fault, if said fault is due to said congestion in said data network.

35. The computer system as described in claim 27, wherein said method further comprises:
- displaying network location of said fault; and
- displaying a cause of said fault.

36. The computer system as described in claim 27, wherein said fault data includes performance data from said data network.

* * * * *